United States Patent
Collet et al.

(10) Patent No.: US 8,234,386 B2
(45) Date of Patent: Jul. 31, 2012

(54) SYSTEM AND METHOD FOR DELIVERING DIGITAL CONTENT

(75) Inventors: Jean-Luc Collet, La Gaude (FR); Francois-Xavier Drouet, La Gaude (FR); Fabien Lanne, Valbonne (FR)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 12/271,956

(22) Filed: Nov. 17, 2008

(65) Prior Publication Data

US 2009/0138604 A1    May 28, 2009

(30) Foreign Application Priority Data

Nov. 23, 2007   (EP) ..................... 07301578

(51) Int. Cl.
*G06F 15/16*   (2006.01)
(52) U.S. Cl. ............... 709/227; 709/231; 725/2; 725/4; 725/32; 725/42; 725/86; 370/386
(58) Field of Classification Search ............... 709/227, 709/231; 725/2, 4, 11, 32, 42, 86; 370/386
See application file for complete search history.

(56) References Cited

U.S. PATENT DOCUMENTS

| | | | |
|---|---|---|---|
| 2002/0016961 A1* | 2/2002 | Goode | 725/9 |
| 2004/0133467 A1* | 7/2004 | Siler | 705/14 |
| 2004/0158870 A1* | 8/2004 | Paxton et al. | 725/115 |
| 2006/0161635 A1* | 7/2006 | Lamkin et al. | 709/217 |
| 2008/0040742 A1* | 2/2008 | Howcroft et al. | 725/34 |
| 2008/0276267 A1* | 11/2008 | Badt et al. | 725/32 |
| 2008/0310408 A1* | 12/2008 | Thompson et al. | 370/386 |
| 2009/0187939 A1* | 7/2009 | Lajoie | 725/34 |

* cited by examiner

*Primary Examiner* — Thuong Nguyen
(74) *Attorney, Agent, or Firm* — Hoffman Warnick LLC; Douglas A. Lashmit

(57) ABSTRACT

A system for delivering digital content to user devices. The system includes a content delivery server for establishing respective sessions with the user devices and for delivering streams of content to the user devices during the sessions according to a streaming protocol. An asset server is communicatively coupled to the content delivery server through an asset protocol for maintaining an asset scheduling table including asset entries, each asset entry including an asset identifier identifying a given asset in association with a starting time parameter, user identifiers identifying at least one target user device, and a set of session identifiers each identifying a session established with a target user device identified by the user identifiers. The content delivery server inserts, for each asset entry in the asset scheduling table, and for each session identified by a session identifier in the asset entry, the asset identified by the asset identifier of the asset entry into the stream of content delivered during the session, at a predefined insertion time.

13 Claims, 7 Drawing Sheets

208

| AdID | AdDuration | AdKeywords | AdRating |
|---|---|---|---|
| AdID0 | T0 | car, sport,men… | PG13 |
| … | … | … | … |
| … | … | … | … |
| … | … | … | … |

/─ 204

| AdID | UserID or ProfileIDList | VODSessionID | AdStartTime | DURATION | Lock-Interaction |
|---|---|---|---|---|---|
| adID1 | ProfileIDList1 | VODSessionID11, VODSessionID11, ..., VODSessionID1k | AdStartTime1 | T1 | True |
| adID2 | UserID2 | VODSessionID2 | AdStartTime2 | T2 | True |
| ... | ... | ... | ... | ... | ... |
| adIDp | UserIDp | VODSessionIDp | AdStartTimep | Tp | False |

| AdID | AdDuration | AdKeywords | AdRating |
|---|---|---|---|
| AdID0 | T0 | car, sport,men... | PG13 |
| ... | ... | ... | ... |
| ... | ... | ... | ... |
| ... | ... | ... | ... |

FIGURE 4

| UserID | ProfileIDList | Age | Gender | Program types |
|---|---|---|---|---|
| userID1 | ProfileIDList1 | 45 | M | westerns |
| ... | | | | |
| | | | | |
| | | | | |

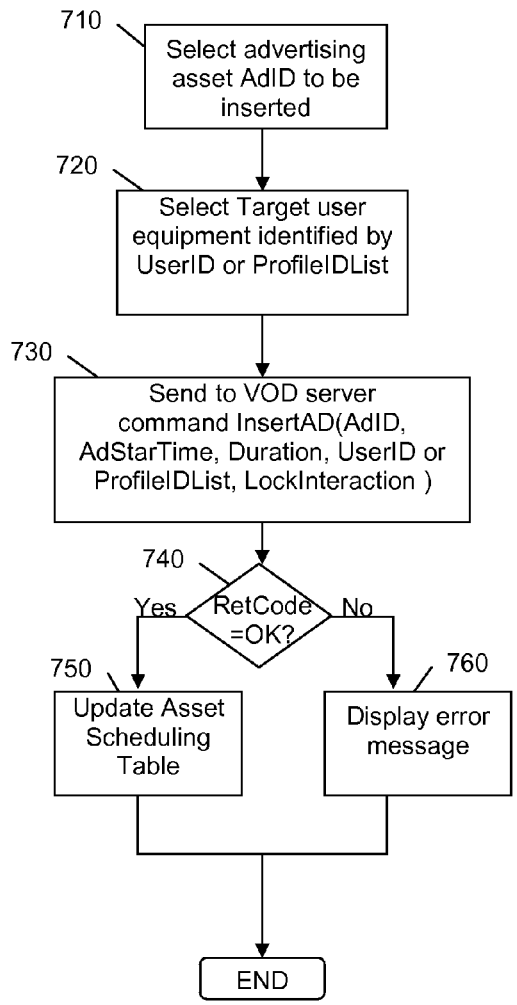 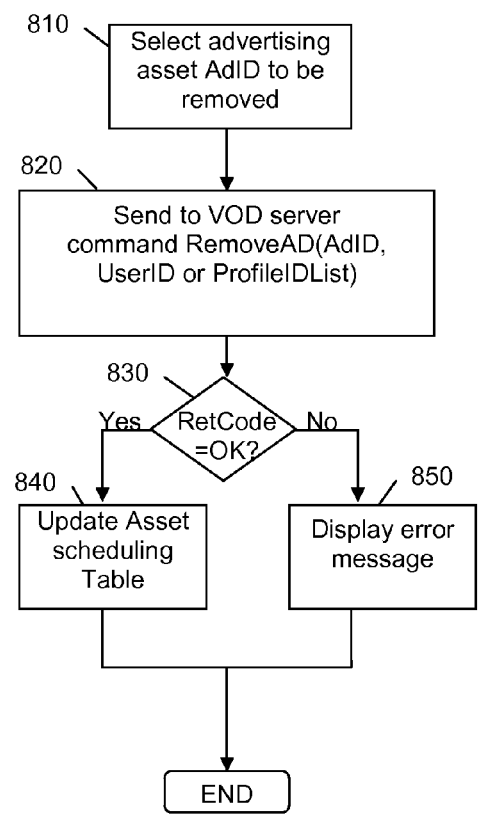
FIGURE 7
FIGURE 8

SYSTEM AND METHOD FOR DELIVERING DIGITAL CONTENT

FIELD OF THE INVENTION

The present invention generally relates to digital content delivery and more specifically to a system and a method for insertion of selected assets into a stream of content, e.g., audio and/or video streams. Further, the invention relates to a system and a method for managing advertising insertion during video delivering sessions, in particular as provided by video on demand technology.

BACKGROUND OF THE INVENTION

Video on demand (VOD) technology allows users to select and watch video content over a network. VOD systems allow a user to view a selected program at any time. The user has simply to select the desired movie or television program from his/her user equipment, and wait for the VOD system to play it on the television set.

User equipment encompasses a broad spectrum of delivery devices, such as a set-top-boxes, a computers, a mobile phones or any system that can receive on-demand audio-visual content over a network.

VOD systems generally include a plurality of video servers that deliver video streams to a user output device having a display, such as a television set, in response to the selection of a video program by the user. VOD systems thus make it possible to provide movies on an individual basis to television sets at different locations.

During a delivery session of a specific video program, the user can submit VCR-like functions to the video servers such as play, stop, pause, fast and back forward functions, in order to control the video session.

VOD systems have improved tremendously during recent years. With the improvements in programming selections, picture and sound quality, the number of subscribers to such systems has increased. Therefore, VOD systems appear for assets providers such as advertisers as a particularly interesting medium for delivering their assets, such as advertisements, public service announcements, weather or emergency notifications and a variety of other content.

A number of advertising solutions have been proposed in the context of television broadcasting. In such solutions, the advertising programs are interleaved with the content in order to be broadcasted at predefined intervals.

Similar solutions are used in VOD systems, but require either that the very content of the video programs stored by the video server include the advertising assets or that tags be inserted therein. As a result, the nature of the asset and the intervals at which the assets are to be streamed are predefined.

Therefore, advertisements are generally delivered indiscriminately to users. Every viewer receives the same advertisements, generally at the beginning of the video program, whether or not they may show an interest in these advertisements.

Other solutions are known that do not modify the content of the video programs but require specific user equipment. These solutions therefore involve further costs and do not apply to the users who are not equipped with specific user equipment.

Another significant disadvantage of existing VOD systems, from the perspective of advertising providers, is that they enable a viewer to skip advertisements. The user may simply activate the forward or fast forward functions to skip advertisements. As a result, the advertisers are less willing to use such solution when they are aware that the users can easily skip the advertisements.

SUMMARY OF THE INVENTION

In view of the foregoing and other exemplary problems, drawbacks, and disadvantages of the conventional systems and methods, and in order to address these and other problems, the present invention provides a system and method for insertion of selected assets into a stream of content.

The invention allows dynamic managing of advertising insertion during Video on Demand (VOD) sessions, and in particular to personalize and customize advertising in IPTV like environments.

The interactions between the asset delivery server and the content delivery server through an asset delivery protocol according to the invention make it possible to insert assets into streams of content with no need to modify the very stream of content to interleave the assets. Further, the solution provided by the invention does not require specific adaptation of user equipment such as set top boxes.

With the invention, advertising assets can be dynamically inserted at any appropriate time during a streaming session based on external events, on the profile of the users, the nature of the assets, etc.

The invention also makes it possible to control user interactions with the video server during asset delivery, whereby a user may be prevented to skip an advertising session.

Further advantages of the present invention will become clear to the skilled person upon examination of the drawings and detailed description. It is intended that any auxiliary advantages be incorporated herein.

BRIEF DESCRIPTION OF THE DRAWINGS

Embodiments of the present invention will now be described by way of non-limiting example with reference to the accompanying drawings in which like references denote similar elements.

FIG. 3 shows an exemplary structure of an asset scheduling table, according to an embodiment of the invention.

FIG. 4 shows an exemplary structure of an auxiliary asset table, according to an embodiment of the invention.

FIG. 7 is a flowchart showing the steps performed for scheduling an advertising asset insertion according to an embodiment of the present invention.

FIG. 8 is a flowchart showing the steps performed for cancelling a scheduled advertising asset insertion according to an embodiment of the present invention.

DETAILED DESCRIPTION OF THE INVENTION

Figure 1:
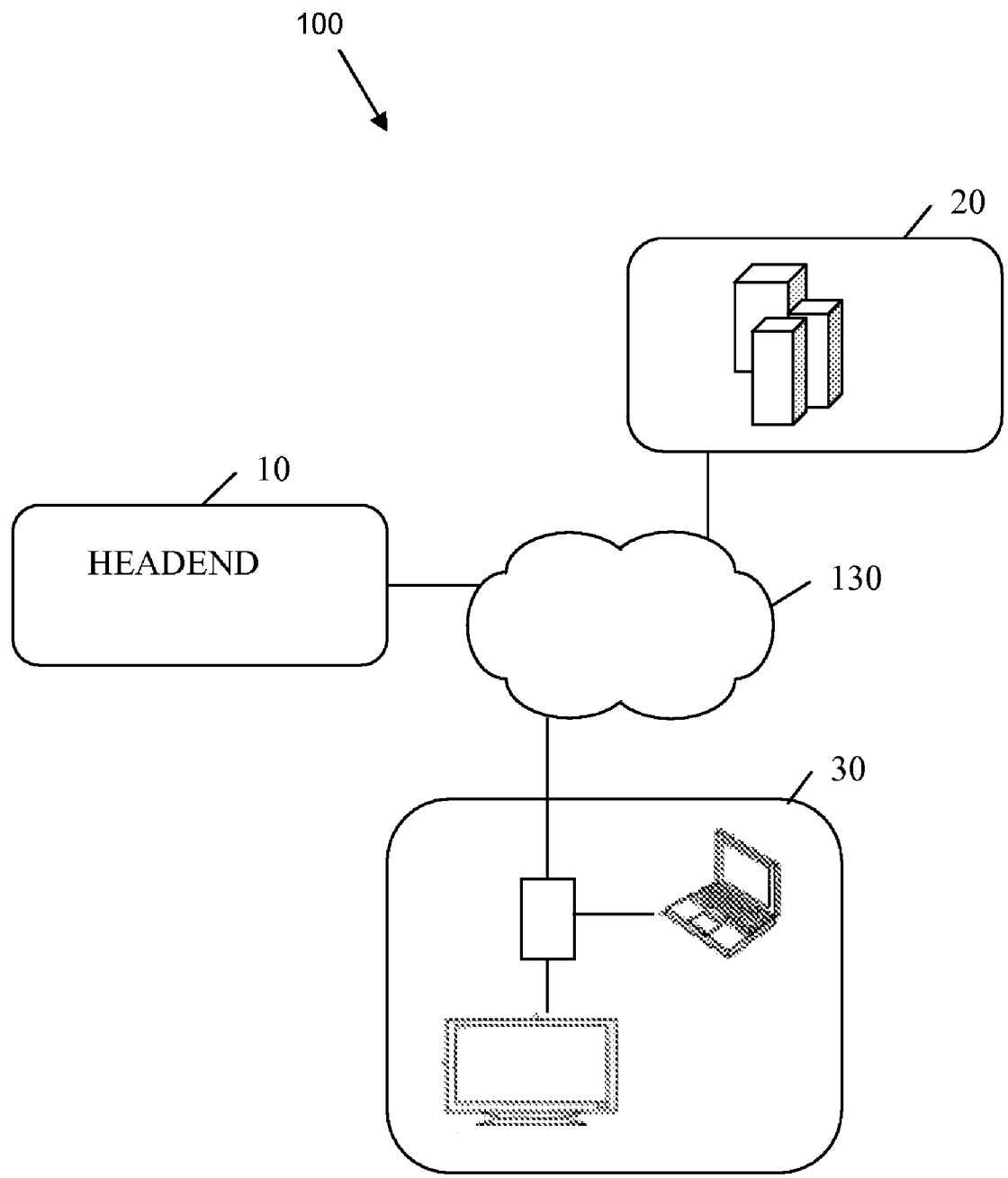
FIG. 1 shows an installation for delivering video streams to end users according to an embodiment of the invention.

Referring to FIG. 1, there is shown the overall structure of a system 100 for delivering streams of contents, according to an embodiment of the invention, and more specifically for on-demand delivery such as Video On Demand (VOD).

The description thereinafter will be made with reference to a VOD delivery system 100, for illustrative purposes only. However, as would be evident to the skilled person, the invention is not limited to the VOD applications, and indeed can be practiced in many different environments and applications.

System 100 comprises a headend part 10 which includes content providers and specific equipment needed to transmit and receive digital content (satellite receiver, encoders, etc . . . ). Such equipment is provided to ensure transportation of digital content onto the IP network.

System 100 further comprises a middleware part 20 including an infrastructure for ensuring the delivery of video streams to end users as well as insertion of digital assets into video streams. Digital assets may include any type of asset such as advertisements, public service announcements, weather notifications, and a variety of other content. The following description will be made with reference to assets of advertising type for illustrative purposes.

The middleware part 20 may include several components such as an IP network infrastructure, portal servers, storage components, servers, etc.

The system 100 according to the invention also includes user devices 30 which are installed at users' homes for ensuring consumption of the video streams and advertising assets by end-users. Such devices are heterogeneous and depend from the nature of the services provided to the users. They may include user equipment such as phones, PDAs, set-top boxes, personal computers, and additional communication devices such as DSL modems, wireless access points, etc.

The headend part 10, the middleware part 20, and the user devices 30 communicate through an appropriate communication network 130, for instance an Internet Protocol backbone.

In a VOD system, a video program, such as a movie or TV program, is sent over a computer network to a user device in response to a user request. A VOD system also provides the end users with basic VCR-like operations such as pause, rewind, fast forward, etc.

The VOD system 100 may be used in IPTV (Internet Protocol Television) environment. IPTV allows a digital television service to be delivered using the Internet Protocol (IP) over the network infrastructure. IPTV can be supplied on any user equipment that has internet technology built into it, for example, desktop PCs, IP set-top boxes, game consoles, mobile phones, handheld devices, car stereos, and home media players. It establishes a personalized relationship between a user and a broadcaster through a transactional request/response mechanism, rather than just picking up a broadcast that sends it to all the users as a whole.

Figure 2:
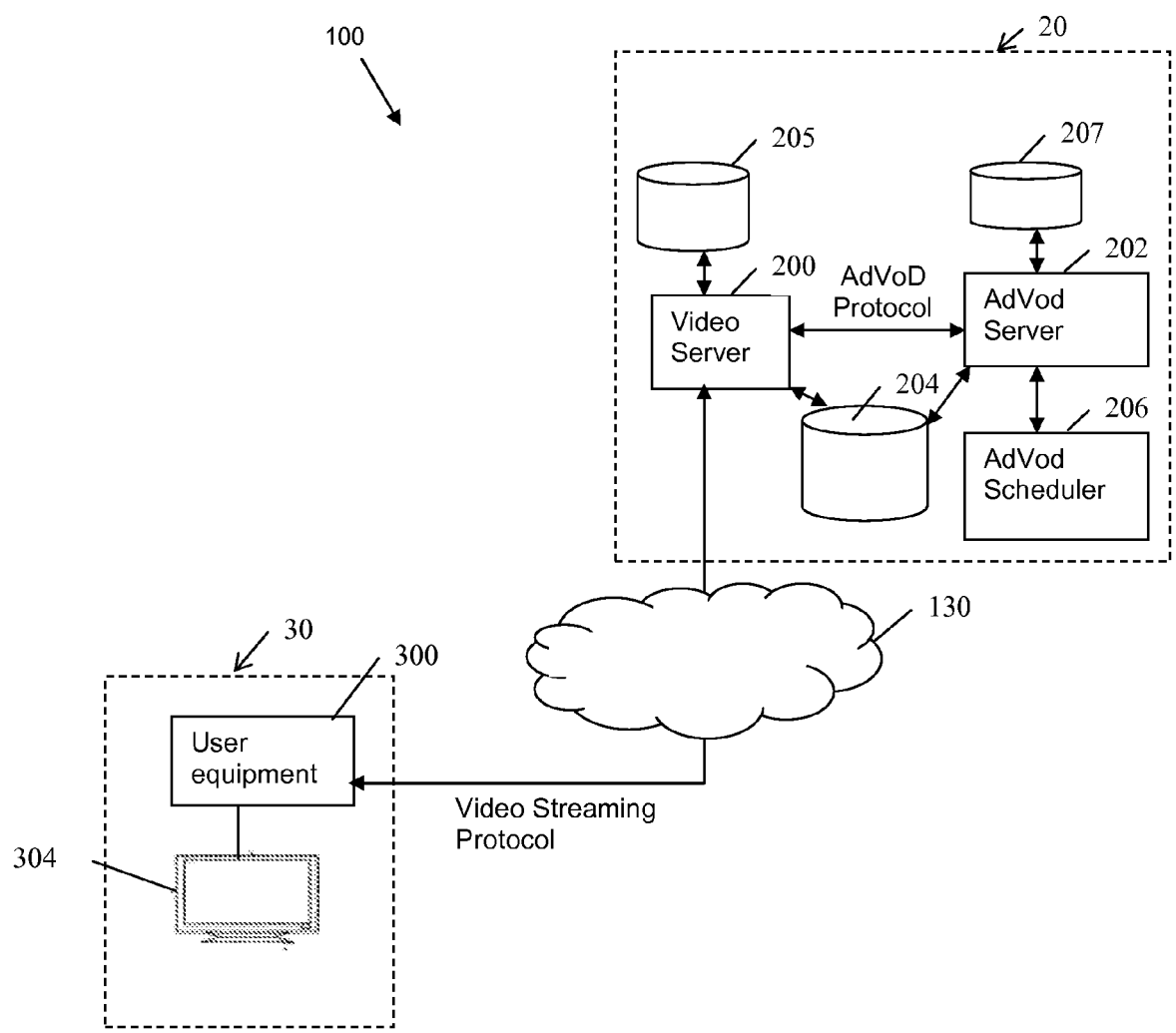
FIG. 2 is a diagram showing a system for insertion of advertising assets into video streams according to an embodiment of the invention.

Reference is now made to FIG. 2 illustrating the structure of the system according to the invention.

As shown in FIG. 2, the middleware part 20 comprises one or more content delivery servers 200 interacting with respective user equipment 300 of the user device part 30, through a streaming protocol. The following description will be made with reference to a unique content delivery server 200, for illustrative purpose only. The content delivery server 200 will be referred to thereinafter as "VOD server".

Each user can send a request to the VOD server 200 for a particular video program from its user equipment 300 (e.g., a set-top box).

The VOD server 200 has storage means 205, such as a disk array, for storing a number of videos assets (e.g., movies) that are selectable by users. The VOD server 200 is coupled to the communication network 130 by way of a conventional network interface, and is operable to stream the selected video program to a user display device, such as a television set 304. During the video program streaming, the user can submit VCR control requests such as start, stop, pause and resume requests as provided by the streaming protocol.

The invention provides an asset server 202, referred to thereinafter as "AdVOD server", for dynamically inserting selected assets into targeted streams of content, in a personalized manner.

The invention further provides an asset protocol, thereinafter called "ADVOD protocol", for exchange of instructions and commands between the AdVOD server 202 and the VOD server 200. The VOD server 200 is adapted to support the AdVOD protocol. The VOD server 200 and the AdVOD server 202 cooperate through the AdVOD protocol to manage insertion of a given asset into a set of existing VOD sessions.

More specifically, the AdVOD server 202 is provided to send commands according to the ADVOD protocol to the VOD server 200 for managing insertion of selected assets into streams of VOD content delivered to target users.

The selection of assets may be performed by an asset administrator or alternatively by a AdVOD scheduler 206 that determines which advertising assets are to be streamed, when and for which target users, based on various parameters such as the number of users using the VOD service, the nature of the selected video programs, the profile and/or the location of the end users. The following description will be made with reference to a VOD server 200 including a VOD scheduler 206.

The system of the invention further includes an asset scheduling table 204 for scheduling insertion of assets into targeted VOD sessions, from the selections of the VOD scheduler 206.

The Asset scheduling table 204 stores data related to each selected asset that is to be inserted into a VOD stream. This data is used to identify the target users or groups of users which are to view the asset, the VOD sessions where the asset has to be delivered, and the time at which the asset is to be inserted into the targeted streams. The asset scheduling table 204 is shared among the VOD server 200, the AdVOD server 202 and the AdVOD scheduler 206.

Referring now to FIG. 3, there is shown an exemplary asset scheduling table 204, according to the invention. The asset scheduling table 204 comprises a number of entries associated with respective assets. Each entry associated with a given asset in the asset scheduling table 204 may include the following parameters:

a parameter "AdID" identifying the selected advertising asset which is to be inserted;

a parameter "UserID" identifying a unique target user who is to view the advertising asset AdID, or a parameter ProfileIDList identifying a group of target users who are to view the advertising asset AdID;

a parameter "VODSessionID" identifying the video session scheduled or started for the user UserID, or a set of video sessions respectively scheduled or started for the users of the group identified by ProfileIDList; and a parameter "AdStartTime" indicating the time at which the advertising asset AdID is to be inserted into the video session(s) VODSessionID.

Each entry of the asset scheduling table 204 may further include:

a "Duration" parameter which designates the duration of advertising asset AdID, and a control parameter "LockInteraction" which may have a true or false value to indicate whether the target user or the target users will be allowed to skip the advertising asset AdID or not.

The VOD server 200 is adapted to update the parameter VODSessionID of the asset entries in the asset scheduling table 204, when a video session is scheduled or started for a target user identified by a user parameter UserID or ProfileIDList in the asset scheduling table 204.

The following description will be made with reference to an asset scheduling table 204 including for each asset entry the above mentioned parameters, for illustrative purposes.

The AdVOD server 202 may maintain an auxiliary advertising table 208 for all the assets contained in the asset storage means 207, including asset identifiers AdID in association with additional information such as a duration parameter "AdDuration" representing the duration of the asset, a Keywords parameter "AdKeywords" designating a list of keywords related to the content of the asset (e.g., "car", "men", "sport" for an advertising asset related to a sportive car), and an advertising rating "AdRating" (e.g., PG13 for Parental Guidance less than thirteen year old). FIG. 4 shows an example of such an auxiliary advertising table 208. For a given user UserID the fields AdKeywords and AdRating give information about the profile of the associated user. Accordingly, the AdVOD scheduler 206 may use the information stored in the auxiliary advertising table 208 to select assets based on the user profile.

Figures 5, 6A:
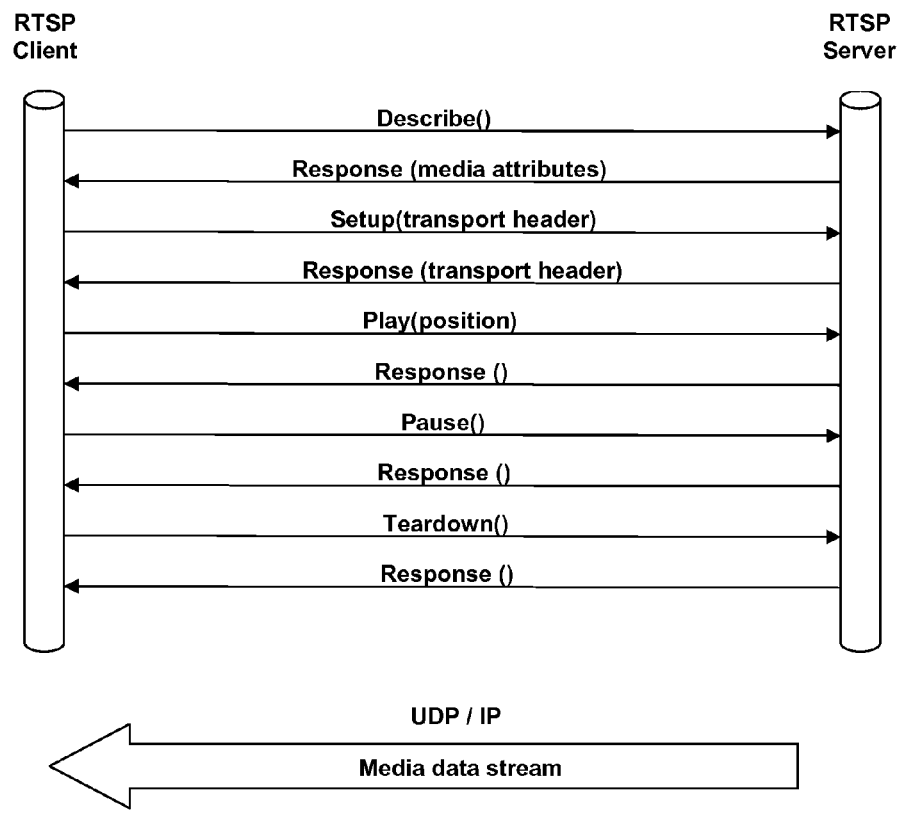
FIG. 5 shows the structure of a profile table maintained by a video server, according to an embodiment of the invention.
FIG. 6A illustrates the conventional RTSP protocol.

The AdVOD server 202 and the AdVOD scheduler 206 may further maintain a profile table which contains correlation information between the user identifiers USerID and the user group identifier profileIDList, as illustrated in FIG. 5. This profile table may further include additional information related to each user profile such as age, gender, a program type field representing the most frequently viewed program categories, etc. The scheduler 206 may check this profile table 209 for asset selections.

The user group identifiers ProfileIDList result from the application of predefined profile rules to the profile table 209, such as "users being more than 40 years old", "users for which the most frequently viewed program type is western", or "users who live in Florida" where the profile table 209 comprises a location field. The application of these rules provides a number of user identifiers UserID belonging to a same profile list identifier.

The VOD server 200 starts video sessions with end users in response to the selection of video programs by the users, e.g., movies or TV programs.

The requested videos programs may be loaded into a memory buffer from the video storage means 205 and then delivered to the user equipment 300 via a buffer, as shown in FIG. 2.

The VOD server 200 includes, for VOD service support, a processor controlled by a VOD scheduler that reserves a channel before starting playback of the requested video program, and by a video player that can start, stop, pause and resume video playback upon client requests after a channel is made available. This allows support of the VOD services via the streaming protocol RTSP.

The VOD server 200 will determine which video sessions are to be started depending on various parameters of the user requests that are queued (e.g., user waiting time, waiting time threshold, video asset duration, etc.) and on various predefined priority rules.

On starting a new video session for a user, the VOD server 200 will create a new entry in the profile table for that user and update the VODSessionID field of the asset scheduling table 204, for each asset entry of the asset scheduling table that identifies the user as a target user in the UserID or ProfileIDList field.

The VOD server 200 then uses a streaming protocol to independently deliver the video streams corresponding to selected video assets to each user.

The streaming protocol may be in particular the Real Time Streaming Protocol (RTSP).

FIG. 6A illustrates the RTSP protocol used between the VOD server 200 and the user equipment 300.

RTSP provides a set of messages that enable the efficient delivery of streamed multimedia content over network 130 from the VOD server 200 to the user equipment 300.

The RTSP protocol provides a set of VCR-style commands such as play, fast-forward, rewind and pause. To perform these operations, the VOD server 200 and the user equipment 300 communicate with RTSP message pairs consisting of a user request and a server response.

More specifically, as shown in FIG. 6A, the user may send REQUEST messages from the user equipment 300 to the VOD server 200 through the communication network 130, for performing the VCR-like operations such as playing, stopping, pausing, fast/back forwarding. Each REQUEST message includes the message type of the action to be performed, such as OPEN( ), PLAY( ), PAUSE( ) and CLOSE( ), with appropriate parameters (e.g., OPEN( ) includes a video Identifier parameter VideoID). For each message sent by the client, the server will send back a RESPONSE message.

Thus, by sending an OPEN message as a REQUEST message to the VOD server 200, a user will create a session with the VOD server 200, the OPEN message containing a video identifier uniquely identifying the requested video asset (e.g., video program) stored by the VOD server 200. The VOD server 200 will then update the video session identifier VODSessionID field in the asset scheduling table 204 and/or in the profile table.

If the session is successfully created, then the VOD server 200 will send back to the user equipment 300 a RESPONSE message containing channel information, such as a multicast address and a port number. The user equipment 300 will then be able to receive the requested video program through the selected channel.

The user may also send a PLAY message to the VOD server 300 in order to have the selected video program played or resumed from a paused state. The RESPONSE message may contain additional information for the user, such as information indicating that the requested program is going to be received.

During program playing, the user equipment 300 may send a PAUSE message to the VOD server 200 to temporarily interrupt playing of the video program. The VOD server 200 will send back a corresponding response.

The user 300 can send a CLOSE message to the VOD server 200 to explicitly close a video session with the VOD server 200. The VOD server 200 then transmits a corresponding response.

RTSP provides other RTSP requests, such as:
  a DESCRIBE request including a RTSP URL, and the type of RESPONSE data that can be handled. The RESPONSE includes the presentation description that lists the media streams controlled with the aggregate URL. The media streams includes typically one media stream for audio and one for video.
  a SETUP request specifying how a single media stream must be transported. The request contains the media stream URL and a transport specifier. The VOD server RESPONSE will confirm the chosen parameters. Each media stream must be configured using SETUP before an aggregate PLAY request is sent.

a RECORD request that can be used to send a stream to the VOD server for storage.

a TEARDOWN request that is used to terminate a video session. It stops all media streams and frees all session related data on the server.

According to the invention, the AdVOD server 202 will cooperate with the VOD server 200 to manage insertion of advertising assets into streams of content delivered by the VOD server 200.

Figure 6B:
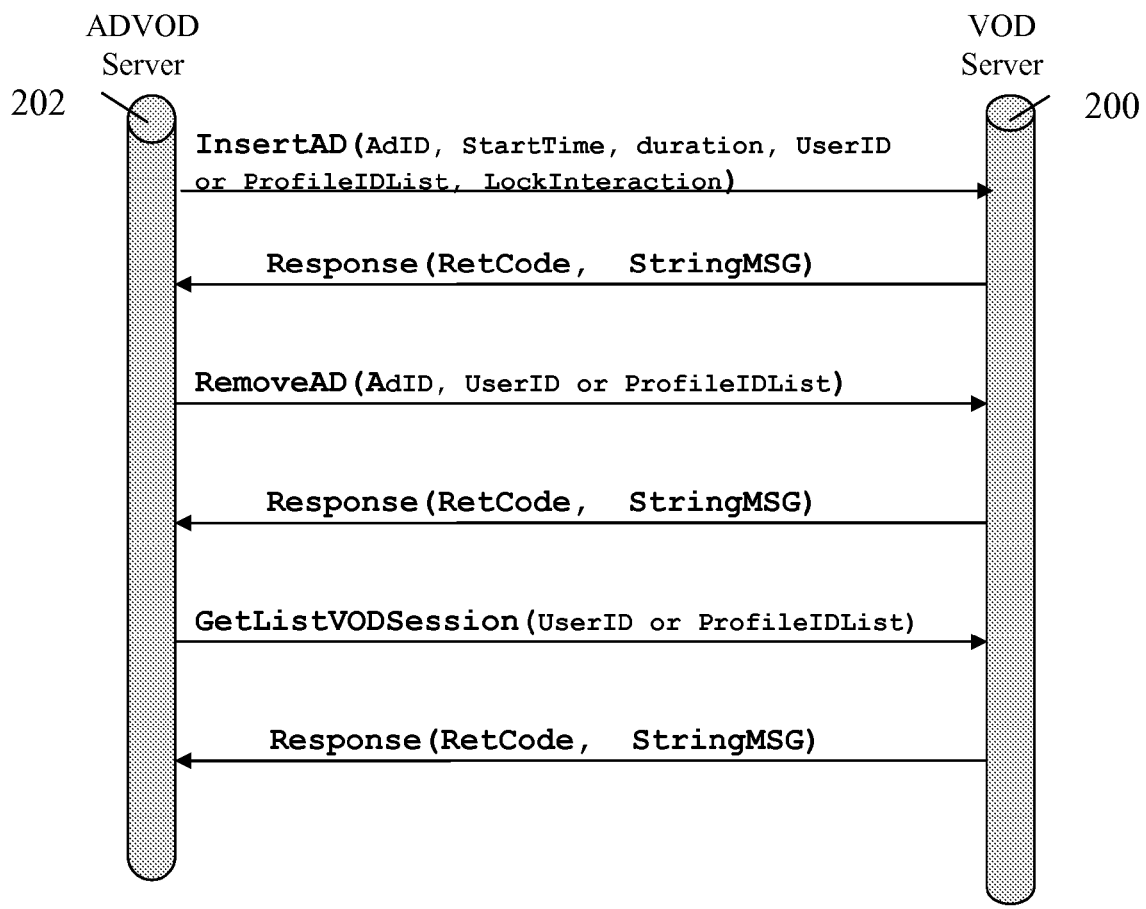
FIG. 6B illustrates the AdVOD protocol according to an embodiment of the invention.

The AdVOD protocol provides verbs/commands managing insertion of advertising assets. FIG. 6B illustrates the AdVOD protocol according to the invention.

The AdVOD protocol is used between the VOD server 200 and the AdVOD server 202. The AdVOD server 202 and the VOD server 200 communicate with message pairs consisting of an AdVOD server request and a VOD server response.

The AVOD protocol includes the following AVOD Commands:

a command Response(RetCode, StringMSG) which is a generic response to all the verbs described below. The parameter "RetCode" may have an "OK" value or a "KO" value and the StringMSG parameter gives the associated text description.

a command InsertAD(AdID, StartTime, duration, UserID or ProfileIDList, LockInteraction)for scheduling the insertion of an advertising asset identified by an identifier AdID, at a starting time "StartTime", after the beginning of a video session or at a fixed time, for a target user identified by his "UserID" or to several target users identified by a "ProfileIDList" designating one or more groups of users. The "LockInteraction" parameter is a Boolean parameter that indicates whether the user is authorized to perform VCR commands (Pause, Fast Forward, Rewind) or not, during the advertising asset streaming.

a command RemoveAD(AdID, UserID or ProfileIDList) for canceling a scheduled insertion of a particular advertising asset, identified by its identifier "AdID", which was to be applied to a target user identified by his "UserID" or to one or several group(s) of user(s) identified by a "ProfileIDList".

a command GetListVODSession(UserID or ProfileIDList) to get the list of the current video on demand sessions being run for a target user identified by his "USerID" or for a set of users identified by the list identifier "ProfileIDList". When the parameter of the command GetListVODSession is of the type ProfileIDList, the answer parameter "StringMSG" of the Response command will return a list of VODSessionID's (e.g., separated by coma).

The commands InsertAD( ), RemoveAD( ) and GetListVODSession( ) are sent by the AdVOD server 202 to the VOD server 200. The VOD server 200 answers these commands with the Response command.

FIG. 7 is a flowchart showing the steps performed to schedule insertion of a new advertising asset into a target Video session.

At step 710, the advertising scheduler 206 selects an advertising asset identified by an asset identifier AdID, based on external events and/or information related to the user profile or the nature of assets.

At step 720, the advertising scheduler 206 selects a single target user identified by UserID or a list of target users identified by ProfileIDList for which the selected advertising asset AdID is to be streamed.

The selection of the asset AdID and the selection of the target users may be based on predefined selection rules related to external events and/or to user profiles and/or to the asset features.

At step 730, the AdVOD Server 202 invokes the function InsertAD(AdID, StarTime, Duration, UserID, LockInteraction) of the AVOD protocol to add a new entry in the asset scheduling table, with the following parameters:

an identifier AdID identifying the selected Advertising asset that is to be inserted;

a StartTime parameter which designates the time at which the streaming of the advertising asset AdID is to be started; the StartTime parameter may be defined by the scheduler 206 or the AdVOD server 202;

a Duration parameter which designates the duration of advertising asset AdID; the Duration parameter may be defined by the scheduler 206 or the AdVOD server 202;

a UserID or ProfileIDList parameter respectively identifying the selected target user or the selected list of target users to whom the advertising asset AdID is to be streamed; and a control parameter LockInteraction which may have a true or false value to indicate whether the target user or users will be allowed to skip the advertising asset AdID or not; the LockInteraction parameter value may be defined by the AdVOD server 202 or the scheduler 206.

At step 740, the VOD server 200 sends back a RESPONSE command to the AdVOD server 202, including a RetCode parameter value. If the parameter RetCode indicates a KO value, then at step 760, the insertion of the asset advertising AdID is denied and an error message is displayed. A KO value may be attributed to the RetCode parameter for example in situations where there are no asset available, or where the user session has been interrupted, or a system error has occurred. If the status RetCode indicates an OK value, then at step 750, a new entry is added in the table UserTable with the fields:

UserID or ProfileIDList receiving the value of the parameter UserID or ProfileIDList of the insertAd function;

AdID receiving the value of the parameter AdID of the insertAd function;

AdStartTime receiving the value of the parameter StartTime of the insertAd function; and a VODSessionID parameter identifying a current video session for the target users identified by UserID or ProfileIDList, if current video streaming sessions have started for the target user(s). If not, when subsequently a new video streaming session is started for the target user(s), the VOD server will check whether there is a record in the UserTable associated to the user identifier UserID (as such or as part of a ProfileIdList parameter) and if so, updates the field VODsessionID of the asset scheduling table.

The asset scheduling table 204 thus provides information for scheduling insertion of assets for target users.

FIG. 8 is a flowchart showing the steps performed to cancel a scheduled asset insertion from the asset scheduling table.

At step 810, the advertising scheduler 206 selects a record from the UserTable to be removed based on predefined removal rules or external events.

At step 820, the AdVOD Server 202 sends the command RemoveAD(AdID, UserID or ProfileIDList) of the AVOD protocol to the VOD server 200, where the parameter AdID identifies the advertising asset that is to be removed, a UserID identifier or ProfileIDList parameter identifying target users for which the advertising asset AdID is to be cancelled.

At step 830, the VOD server 200 sends back a RESPONSE command including a parameter RetCode to the AdVOD Server 202. If the parameter RetCode has a "KO" value, then removal of the scheduled advertising asset from the asset scheduling table 204 is denied at step 850 and an error message is displayed. Otherwise, if the parameter RetCode has an "OK" value, then at step 840, the record corresponding to the advertising asset AdID is removed from the scheduling table 204.

Figure 9:
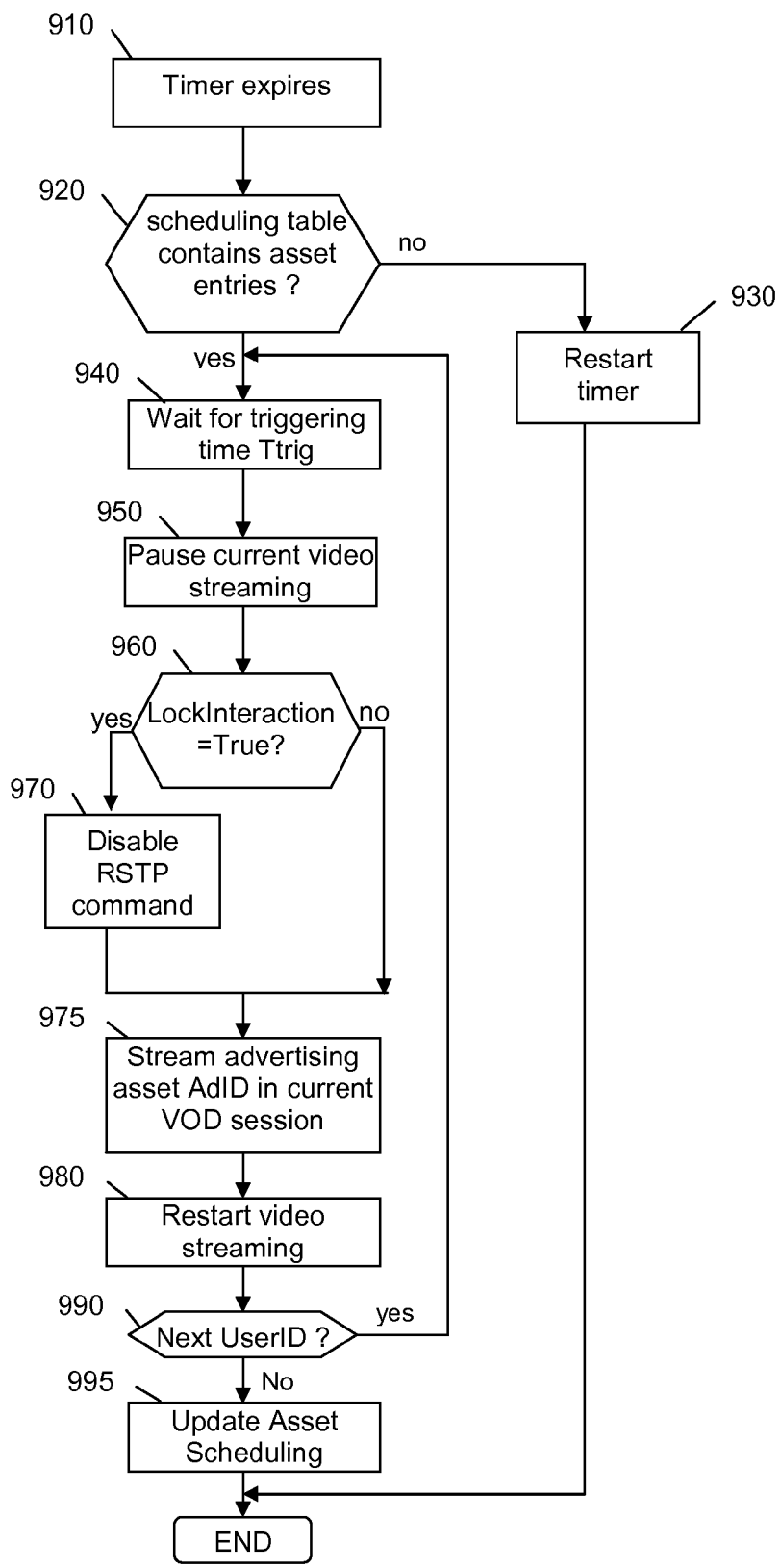
FIG. 9 is a flowchart showing the steps performed for inserting a scheduled advertising asset into a video stream according to an embodiment of the present invention.

Reference is now made to the flowchart of FIG. 9 describing the steps performed to insert a selected advertising asset into a video session, based on the data stored in the scheduling table 204.

A timer is provided for periodic checking of the scheduling table 204 by the VOD server 200.

The timer expires at step 910. The VOD server 200 then checks whether the scheduling table 204 contains an asset entry at step 920. If not, at step 930, the Timer is re-started.

If an asset entry is found in the scheduling table 204 that identifies an advertising asset AdID and a target user UserID or group of target users ProfileIDList, the VOD server 200 continues to stream the current video asset for each target user, until a triggering time Ttrig is reached. The triggering time Ttrig is determined from the AdStartTime value associated with the asset entry in the scheduling table 204, at step 940. In particular, the triggering time Ttrig is defined as the next Video MPEG I-Frame, after the AdStartTime value, in an embodiment where the video encoding format of VOD streaming is based on MPEG technology. Accordingly, video streaming can be stopped on a full image, whereby avoiding video distortion for the target users at the restarting.

At step 950, the VOD server 200 pauses the video streaming and stores the triggering time Ttrig (Iframe identified by an identifier IFrameID) of the current video session for each target user.

At step 960, the VOD server 200 checks the LockInteraction parameter associated with asset entry in the asset scheduling table 204. If LockInteraction has a true value, then any user interaction as regards the RTSP protocol will be disabled at step 970, during the streaming of the advertising asset AdID.

Then at step 975, the advertising asset AdID is streamed for a time given by the parameter Duration of the command insertAD associated with the asset entry in the asset scheduling table 204.

At step 980, once the advertising asset streaming is terminated, the current video on demand session is restarted at a restart time Trestart determined from the triggering time Ttrig previously stored (Iframe identified by the identifier IFrameID) in the asset scheduling table UserTable, without any disruption from the user point of view.

At step 985, the commands of video streaming protocol (e.g., RTSP commons) are re-enabled in case they were previously disabled.

At step 990, for each other video session identified in the field VODsessionID of the asset entry AdID, steps 940 to 990 are repeated.

At step 995, when the advertising asset AdID has been inserted into all the video sessions identified by the video session identifiers VODSessionID associated with the asset entry AdID in the asset scheduling table 204, the asset entry AdID is removed from the asset scheduling table 204 by the VOD Server 200.

The invention thus makes it possible to dynamically provide personalized advertising assets into a VOD infrastructure.

With the invention, each video on demand session may have its own advertising assets embedded according to the user profile, or other user criteria.

The invention also makes it possible to insert advertising assets into video assets without modifying the video program content or involving modification of the user equipments.

The insertion of advertising assets into a VOD streaming session according to the invention is made in a transparent manner for end users.

The advertising assets are seamlessly inserted into the program video such that the user does not observe unsightly anomalies during the transitions from the video program to the advertising asset and vice versa.

With the AdVOD protocol, any VOD server may support and delegate dynamic advertisement insertion into a unicast video stream.

The invention can further take the form of an entirely hardware embodiment, an entirely software embodiment or an embodiment containing both hardware and software elements implementing the system and the method according to the invention.

The invention can also take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, or transport the program for use by or in connection with the instruction execution system, apparatus, or device.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. For example, the skilled person will understand that the structures of the asset scheduling table 205, of the auxiliary asset table 208 and of the profile table 209 shown in FIGS. 3, 4, and 5 are for exemplary purposes only, and that other structures could be used alternatively, with additional parameters. The skilled person will also recognize that the invention is not limited to a unique VOD server 200 and AdVOD server 202, but may alternatively include a plurality of VOD servers and/or ADVOD servers.

The invention claimed is:

1. A system for delivering digital content to user devices, the system comprising at least one content delivery server for establishing respective sessions with the user devices and for delivering streams of content to the user devices during the sessions according to a streaming protocol, the system further comprising:

at least one computing device, including:
an asset server communicatively coupled to the at least one content delivery server through an asset protocol for maintaining an asset scheduling table including asset entries, each asset entry comprising an asset identifier identifying a given asset in association with a starting time parameter, user identifiers identifying at least one target user device, and a set of session identifiers each identifying a session established with a target user device identified by the user identifiers, the asset server further comprising an auxiliary table including all assets, each asset including a duration parameter indicating a duration of the asset, a keyword parameter indicating a list of keywords associated with content of the asset, and a rating parameter indicating a user restriction for the asset;

the at least one content delivery server being further adapted, for each asset entry in the asset scheduling table, and for each session identified by a session identifier in the asset entry, to insert the asset identified by the asset identifier of the asset entry into the stream of content delivered during the session, at a predefined insertion time;

wherein each asset entry of the asset scheduling table includes a control parameter, the content delivery server being further adapted to decide, for each asset entry, whether to disable or enable user interaction with the content delivery server during asset streaming, based on the value of the control parameter of the asset entry, wherein the value of the control parameter indicates whether the target user is able to skip the asset streaming.

2. The system of claim 1, wherein the at least one content delivery server is arranged, in response to a session being established with a user device, to determine whether the scheduling table contains an asset entry comprising a user identifier identifying the user device, and if so for updating the session identifier corresponding to the target user device in the asset entry.

3. The system of claim 1, wherein the asset protocol comprises request and response message pairs for communication between the asset server and the content delivery server.

4. The system of claim 1, further comprising a storage system for storing the assets.

5. The system of claim 1, wherein the predefined insertion time at which the content delivery server inserts the asset identified by the asset identifier is determined from the starting time parameter associated with the asset entry.

6. The system of claim 5, wherein each stream of content delivered by the content delivery server is encoded according to an MPEG technology, and the predefined insertion time is defined as a next MPEG I-Frame, after the starting time value.

7. The system of claim 1, wherein the asset insertion performed by the content delivery server comprises pausing the stream of content being delivered at the insertion time, streaming the asset identified by the asset identifier, and restarting the delivery of the stream of content from the insertion time.

8. The system of claim 1, wherein the asset protocol provides an insertion command for insertion of an asset entry in the asset scheduling table, the insertion command including an asset identifier identifying the asset that is to be inserted, a starting time parameter, user identifiers identifying at least one target user device, and a set of session identifiers each identifying a session established with a target user device identified by the user identifiers.

9. The system of claim 1, wherein the asset protocol provides a removal command for removal of an asset entry from the asset scheduling table, the removal command including an asset identifier identifying the asset that is to be removed from the asset scheduling table, and user identifiers identifying at least one target user device.

10. The system of claim 1, wherein the asset protocol provides a get session identifier command designating at least one user identifier for getting the session identifiers identifying the sessions established with the target user devices identified by the at least one user identifier.

11. The system of claim 1, wherein the content delivery server is a video on demand server for delivering preselected video streams to the user devices.

12. The system of claim 1, wherein the streaming protocol is a RTSP protocol.

13. A method of delivering digital content to user devices, the method comprising establishing respective sessions with the user devices and delivering streams of content during the sessions to the user devices according to a streaming protocol, wherein the method further comprises:

maintaining an asset scheduling table comprising asset entries, each asset entry comprising an asset identifier identifying a given asset in association with a starting time parameter, user identifiers identifying at least one target user device, and a set of session identifiers each identifying a session established with a target user device identified by the user identifiers;

maintaining an auxiliary table including all assets, each asset including a duration parameter indicating a duration of the asset, a keyword parameter indicating a list of keywords associated with content of the asset, and a rating parameter indicating a user restriction for the asset; and wherein for each asset entry in the asset scheduling table, and for each session identified by a session identifier in the asset entry, inserting the asset identified by the asset identifier of the asset entry into the stream of content delivered during the session, at a predefined insertion time;

wherein each asset entry of the asset scheduling table further includes a control parameter for selectively disabling user interaction with the asset in the stream of content delivered during the session, wherein a value of the control parameter indicates whether the target user is able to skip the asset streaming.

* * * * *